United States Patent [19]
Vale

[11] 3,734,475
[45] May 22, 1973

[54] LIQUID-SOLID REACTION APPARATUS

[76] Inventor: Thomas Valle, P.O. Box 331, Carbondale, Colo. 81623

[22] Filed: Jan. 31, 9172

[21] Appl. No.: 222,154

[52] U.S. Cl. ............................................. 266/12
[51] Int. Cl. ......................................... C22b 15/12
[58] Field of Search ................... 75/108, 109, 117; 266/12, 22

[56] References Cited

UNITED STATES PATENTS 3,373,984   3/1968   Valle ............................. 266/12

Primary Examiner—Gerald A. Dost
Attorney—Ralph F. Crandell

[57] ABSTRACT

Liquid-solid reaction apparatus for carrying out a continuous flow process, as for example, the production of copper by the reaction of dilute copper sulfate liquors with iron in the form of finely divided powders or particles. A liquid-solid slurry is introduced at a controlled rate into the upper end of a vertical tube which extends coaxially through a cylindrical chamber. The flow of slurry from the lower end of the tube is divided and passed through a plurality of individual coils wound about the exterior of the outer chamber. The flow of slurry from the coils is recombined at the lower end of the chamber and passed upwardly through the annular flow passage defined between the outer side of the inlet tube and the inner wall of the chamber. The slurry is discharged from an outlet at the upper end of the chamber. During its flow through the central tube and chamber, the slurry is subjected to agitation to maintain the slurry in a thoroughly mixed condition. The external coils are likewise distorted or compressed at spaced locations to establish a turbulent slurry mixing action to the slurry as it passes through the coils.

8 Claims, 9 Drawing Figures

LIQUID-SOLID REACTION APPARATUS

RELATED PATENTS

The present invention, in certain of its aspects, discloses improvements to the liquid-solid reaction apparatus which forms the subject matter of my previous U.S. Pat. No. 3,373,984.

BACKGROUND OF THE INVENTION

Although useful in other processes, the present invention is specifically directed to the continuous precipitation of copper by mixing a copper sulfate liquor with powdered or sponge iron particles to produce a ferrous sulfate solution and metallic copper. In carrying out this process, a slurry is formed in a continuous manner by introducing the iron particles at a controlled rate into a continuous flow of copper sulfate. The slurry thus formed is then passed through a series of reaction chambers at a flow rate such that the retention time of the slurry within the chambers is sufficient to enable a complete reaction to occur to precipitate the copper. To facilitate the reaction, it is necessary that the slurry be agitated to maintain the solid iron particles in suspension to assure maximum contact and mixing of the solid particles in the solution.

Because the process as thus practiced involves a continuous flow of slurry through the reaction apparatus, it is desirable that the agitation be produced by simple stationary flow directing devices which will produce the necessary mixing action reliably with a minimum of maintenance and at flow rates which permit the desired retention time. Further, the apparatus must accomodate the chemical reaction in a manner such that undue pressures and temperatures do not build up.

SUMMARY OF THE INVENTION

The apparatus of the present invention includes a vertically disposed inlet tube which is concentrically located within an enlarged cylindrical chamber. The slurry is formed by mixing the solid particles with a continuous flow of liquid at the upper end of the inlet tube. The slurry flows downwardly through the tube and passes through a series of plates formed with restricted flow passages or nozzles which induce a swirling flow of the slurry as it passes downwardly through the inlet tube. From the inlet tube, the slurry passes through a pump which further agitates the slurry and provides the necessary pressure for flowing the slurry back upwardly through the annular chamber between the inlet tube and outer cylindrical shell. From the pump outlet, the flow of slurry is divided among a series of slurry conducting coils wound around the outer side of the cylindrical shell. The coils enable the temperature of the reacting slurry to be controlled to a degree sufficient to assure that the reaction is carried on within the desired temperature range. By constructing the coils from a flexible tubing and clamping or compressing the coils at spaced points, agitation of the slurry during its passage through the coils is achieved. From the coils, the flow of slurry is recombined in the lowermost of several compartments of the annular chamber surrounding the inlet tube on the inner side of the outer shell. This annular chamber is divided into a plurality of vertically stacked compartments separated from each other by annular plates supported by and extending between the inner tube and the chamber shell. The plates are provided with a plurality of nozzles defining flow passages through the plates, the nozzles being oriented to again induce a swirling flow of slurry as the slurry passes upwardly through the several compartments. A weir at the upper end of the annular chamber forms an outlet for the slurry from the apparatus.

Other features and advantages of the invention will become apparent from the following specification and the drawings.

Figure 1:
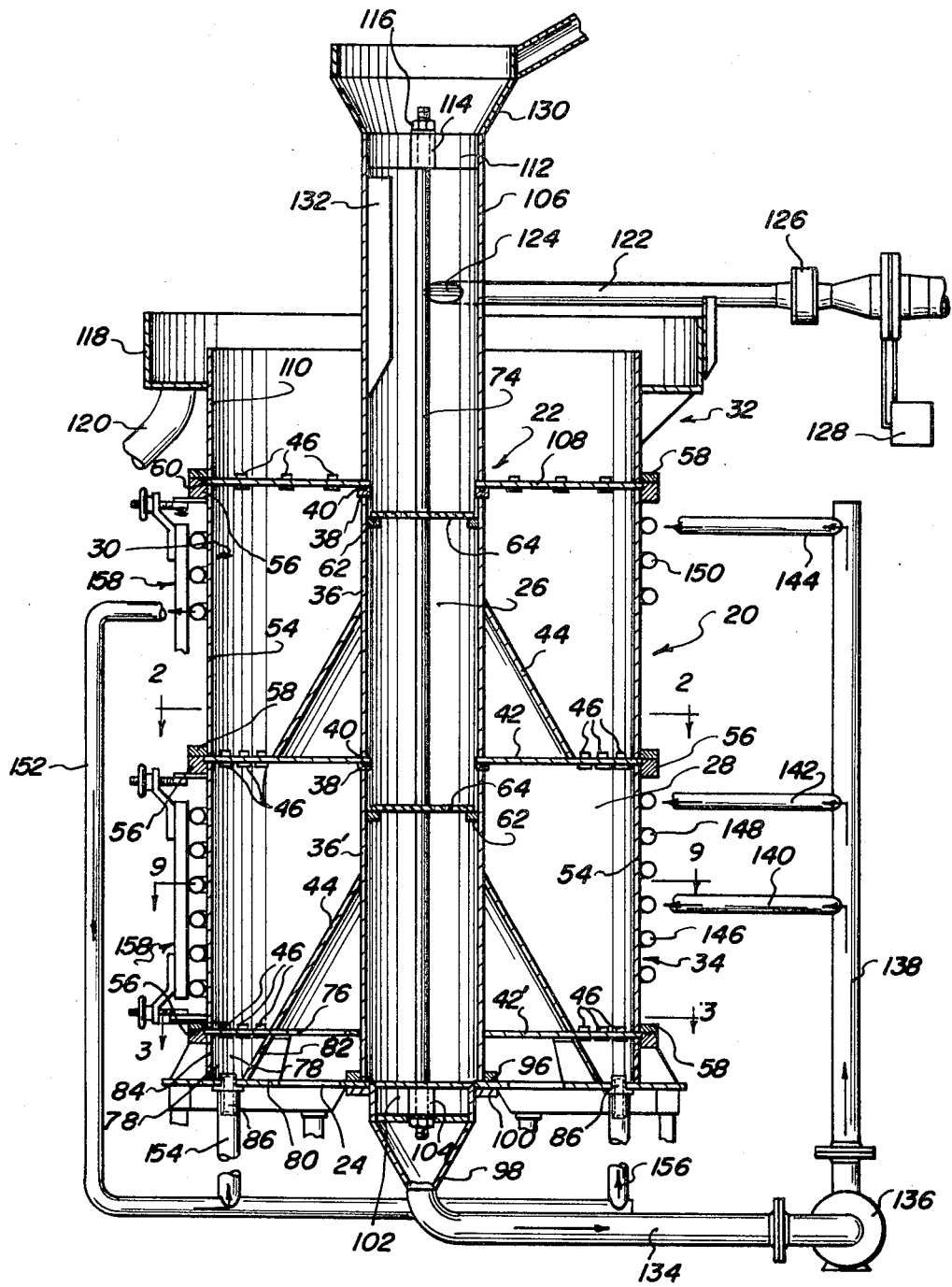
FIG. 1 is a vertical cross-sectional view taken on a plane passing through the vertical axis of one form of apparatus embodying the present invention.

Referring first to FIG. 1, one form of the invention is embodied in an apparatus which includes a vertically disposed cylindrical shell assembly designated generally 20, open at its upper end and having a coaxially disposed cylindrical tube assembly 22 extending downwardly through the open upper end of shell 20. Tube 22 is sealed at its lower end to an annular plate 24 which extends across and closes the opening between the lower end of shell 20 and that of tube 22. The assembly consisting of outer shell 20, central tube 22 and bottom plate 24 defines concentric inner and outer flow passages 26 and 28 through which a liquid-solid slurry is flowed.

Central tube 22 and outer shell 20 are constructed from a series of individual modular units which are axially clamped to each other in end-to-end relationship to form the completed structure. In the embodiment shown in the drawings, the apparatus includes but a single intermediate modular unit designated generally 30 located between modified upper and lower end units 32 and 34.

Unit 30 is constructed with a cylindrical tube section 36 having an enlarged annular flange 38 integrally formed or welded to its upper end. Flange 38 is formed with a groove in its upper or axially facing surface to receive an o-ring 40 to provide a seal at this region with the next adjacent unit. An annular plate 42 is welded to the lower end of tube section 36 to project radially outwardly from the tube section. A frusto-conical skirt 44 is welded at its upper and lower ends to the outer side of tube section 36 and to the upper surface of plate 42 to provide structural rigidity to the assembly and to also define in the final assembly a divergent flow section in outer passage 28.

Figure 2:
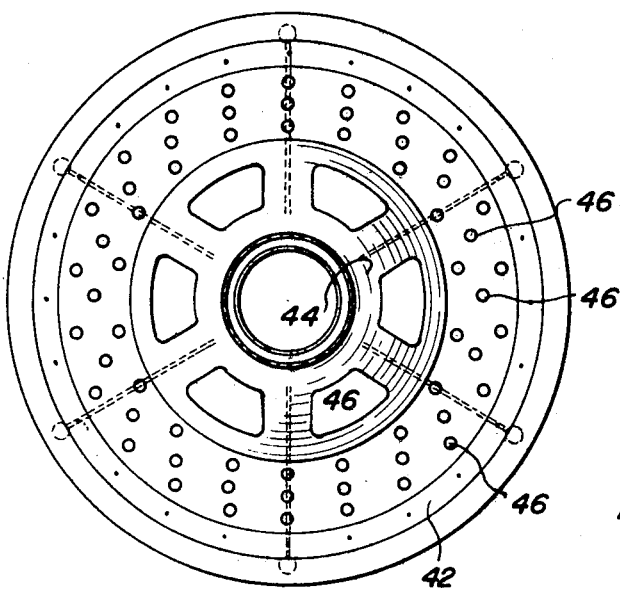
FIG. 2 is a cross-sectional view taken on line 2—2 of FIG. 1.
Figure 5:
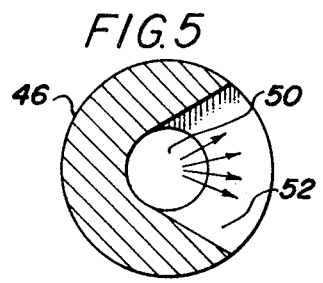
FIG. 5 is a detail cross-sectional view of one of the nozzles taken on line 5—5 of FIG. 4.
Figure 7:
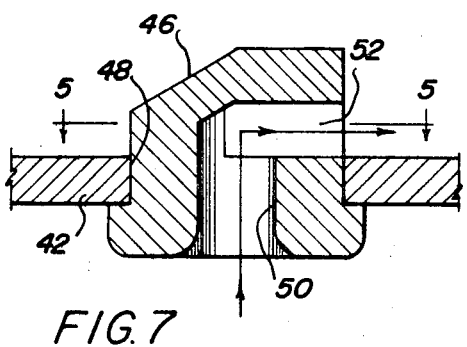
FIG. 7 is a detail cross-sectional view of one of the nozzles in the inlet plates taken on line 7—7 of FIG. 6.

In that portion of plate 42 located radially outwardly of the juncture of plate 42 and skirt 44, flow passages through plate 42 are defined by a plurality of nozzles 46 disposed in three concentric rings as best seen in the plan view of FIG. 2. The structure of the nozzles is shown in the detailed cross-sectional views of FIG. 5 and 7, each nozzle being force fitted into a bore 48 in plate 42 and formed with an axially extending inlet passage 50 which communicates with a radially directed divergent outlet opening 52 which is substantially flush with one surface of plate 42. The individual nozzles 46 are mounted in plate 42 with the outlet openings directed in a tangential direction to discharge slurry in a swirling flow which sweeps across the upper surface of plate 42.

Referring now to FIG. 1, the remaining major element of modular unit 30 is a relatively large diameter cylindrical section 54 which forms a portion of outer shell 20. Annular flanges 56 and 58 are welded to the upper and lower ends of cylindrical section 54 and are provided with axially extending bolt holes (not shown) around their periphery so that adjacent modular units can be axially clamped to each other. Preferably, the upper annular flange 56 is formed with an annular groove as at 60 to receive the peripheral edge of the annular plate of the next section.

Figure 6:
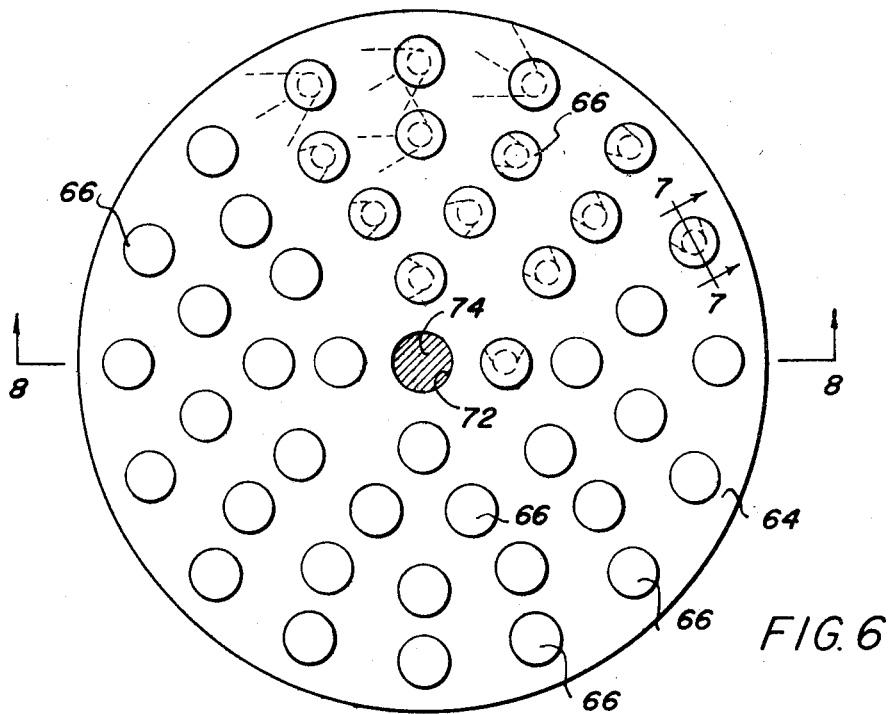
FIG. 6 is a top plan view of one of the disc-like flow directing plates mounted in the inlet tube.
Figure 8:
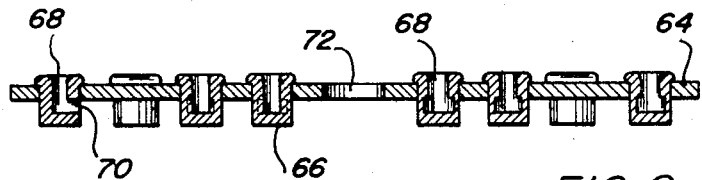
FIG. 8 is a transverse cross-sectional view of the plate of FIG. 6 taken on the line 8—8 of FIG. 6.

An annular rib 62 is welded to the inner periphery of tube section 36 adjacent its upper end to form a platform upon which a disc-like plate 64 is mounted. Details of plate 64 are best seen in FIGS. 6 and 8. As best seen in FIG. 6, a plurality of nozzles 66 are mounted in plate 64, the nozzles 66 being substantially identical in configuration to nozzles 46 described above. The primary distinction between nozzles 66 and nozzles 46 is that the inlets 68 of nozzles 66 are at the upper side of plate 64 and the nozzle outlets 70 are located at the lower side of the plate. As was the case with nozzles 46, the outlet openings of nozzles 66 are directed tangentially of the circular plate to establish a swirling flow of slurry discharged from the nozzle outlets 70. Plates 64 are formed with a centrally located bore 72 which accomodates the passage of a centrally located clamping rod 74 which clamps the units axially together into their assembled condition.

While the specific apparatus disclosed in the drawings shows only one intermediate modular unit 30, two or more intermediate units 30 may be employed, depending upon the requirements of the specific installation.

The construction of the lower modual unit 34 is in many respects similar to that of intermediate modular unit 30. To avoid repetition of description, those components of lower modular unit 34 which are common with components of modular unit 30 are identified by the same reference numerals and are not described again in detail.

Lower modular unit 34 includes a slightly modified form of central tube section 36' which differs from tube section 36 of modular unit 30 in that it is of somewhat greater axial length and projects through and beyond a slightly modified form of annular plate 42'. Annular plate 42' differs from the annular plate 42 of intermediate modular unit 30 in that plate 42' has a slightly larger central opening conformed to the outer diameter of tube 36' rather than to the inner diameter as was the case with plate 42. Plate 42' may also, if desired, be formed with weight reducing openings 76 in the region radially inwardly of the juncture of plate 42 with a frusto conical skirt 44, identical with the skirt 44 of unit 30. As was the case with plate 42, that portion of plate 42' radially outwardly of its juncture with skirt 42 is provided with a series of nozzles 46, identical in structure, location and orientation to the nozzles 46 of plate 42. Near its upper end, tube section 36' has a welded rib 62 in its interior which supports a plate 64 in the same fashion as in modular unit 30. The upper end of tube section 36' includes a welded flange 38 and o-ring seal 40 identical to those previously described above. Lower unit 34 further includes a large diameter cylindrical section 54 which is provided with upper and lower flanges 56 and 58 of the same construction as those of modular unit 30.

Figure 3:
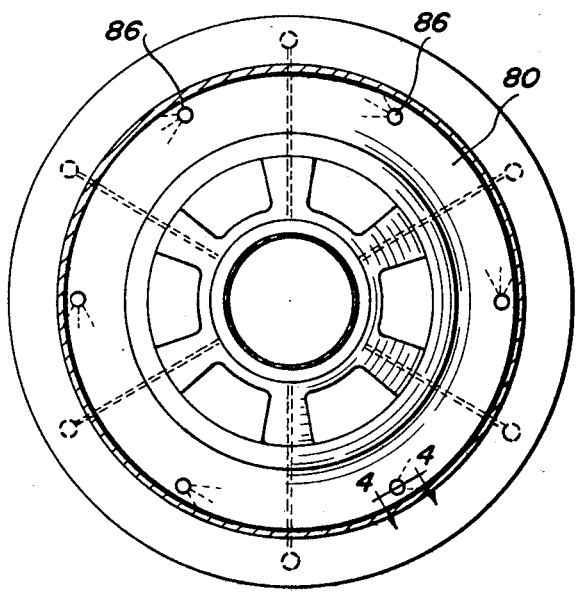
FIG. 3 is a detail cross-sectional view taken on line 3—3 of FIG. 1.
Figure 4:
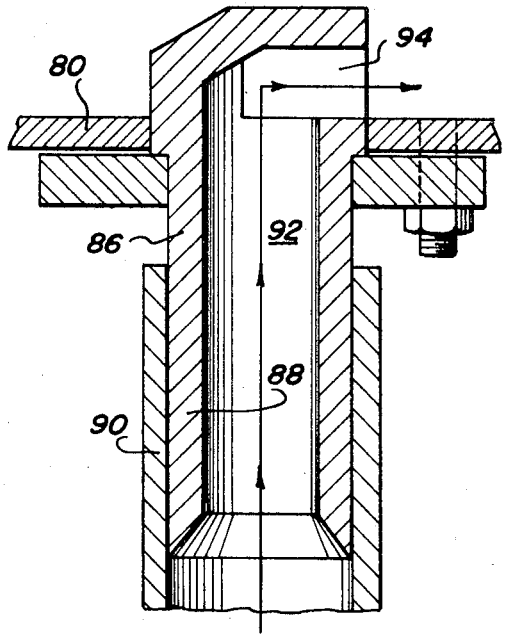
FIG. 4 is a detail cross-sectional view taken through one of the inlet nozzles of the annular chamber approximately on line 4—4 of FIG. 1.

The primary distinction between lower unit 34 and intermediate unit 30 resides in the addition of structure defining an inlet compartment 78 at the bottom portion of unit 34. This compartment is defined by an annular plate 80, an annular frusto conical skirt portion 82 welded to plate 80 and bolted at its upper end to the under surface of plate 42', and a relatively short cylindrical section 84 welded to the upper surface of plate 80 and provided with a clamping flange 56 at its upper end. As best seen in FIGS. 3 and 4, plate 80 is provided, in the illustrated embodiment, with six symetrically disposed nozzles 86 functionally similar to, but differing slightly in construction from nozzles 46. As best seen in the cross sectional view of FIG. 4, nozzles 86 are of generally larger overall dimensions than nozzles 46 and are axially extended as at 88 to provide an external nipple for attaching an inlet conduit to the nozzle. The inlet passage 92 and outlet 94 of nozzles 86 are of the same configuration but of greater dimensions than the inlets and outlets of nozzles 46 because the flow passage area defined by the six nozzles 86 corresponds in total area to the flow passage area defined by some 60 nozzles 46.

At the lower end of tube section 36' an external flange 96 is welded on to tube section 36'. An outlet fitting 98 is formed at its upper end with a flange 100, and bolts, not shown, passing through flanges 100, plate 80 and flange 96 are employed to sealingly clamp outlet fitting 98 to the lower end of the central flow passage 26. A spider 102 consisting of three or more relatively narrow radially extending plates fixed in the interior of fitting 98 support a centrally located collar 104 which anchors one end of the central clamping rod 74.

Upper modular unit 32 includes a central tube section 106 to whose lower end is welded a radially extending plate 108. Plate 108 is provided with a series of nozzles 46, identical in construction and number to the nozzles 46 in plate 42, but arranged somewhat differently in three concentric circles uniformally distributed radially of the plate. A somewhat shorter cylindrical shell section 110 with a welded flange 58 at its lower outer periphery, the structure of this latter flange being identical to that of the flange 58 on intermediate unit 30.

At the upper end of tube 106, a spider 112, similar in construction to the spider 102 supports a centrally located hub 114 through which passes the central clamping rod 74. By tightening a nut 116 on a terminal threaded section of rod 74, the central tube sections 106, 36, 36' and outlet fitting 98 are axially clamped to seal the joints between the respective units and to provide structural support for the various plates 108, 42 and 80.

An annular trough assembly 118 is fixedly mounted at the upper end of cylindrical section 110 to receive slurry which overflows the upper edge of section 110 and to conduct the overflowed slurry into an outlet pipe 120.

An inlet pipe 122 for feeding the liquid component of the slurry into the interior of the assembled central tube 22 feeds the liquid component into the upper section of tube 106 as at 124 in a tangential direction. The flow of the liquid component through inlet pipe 122 is controlled by a diaphragm valve 126 which in turn is automatically adjusted by a flow meter 128 to maintain a constant rate of flow of the liquid component of the slurry into the apparatus. The solid particles of the slurry are fed directly into the upper end of tube 106 through a hopper 130, the rate of flow of the solid particles being controlled in accordance with the rate of flow of the liquid component through inlet tube 122 by suitable mechanism well known to those skilled in the art. If desired, an overflow weir 132 may be provided in the upper end of tube 106.

In the intended mode of operation, the slurry is formed by mixing the liquid and solid components within the interior of upper tube section 106 and flowing the slurry downwardly through the assembled central tube 22, the slurry passing through nozzles 66 in the disc-like plates 64 mounted within tube 22. Slurry passing from the lower end of tube 22 through outlet fitting 98 is conducted by a conduit 134 to the intake side of a motor driven pump 136. The outlet of pump 136 is connected to a manifold 138 having branch outlet conduits 140, 142 and 144 respectively connected to slurry-conducting coils 146, 148 and 150.

Each of coils 146, 148 and 150 consist essentially of approximately three turns of plastic or some other type of flexible resiliently walled tubing, the three turns of each coil being trained around the outer side of outer shell 20. Referring to the uppermost coil 150, the outlet of this coil is connected via a main conduit 152 and two branch conduits 154 and 156 to two diametrically opposed nozzles 86 in the lowermost plate 80. Coils 148 and 146 are similarly connected each to two other diametrically opposed nozzles 86 in plate 80 to conduct slurry from the respective coils to the inlet compartment 78 at the lower end of outer flow passage 28.

Figure 9:
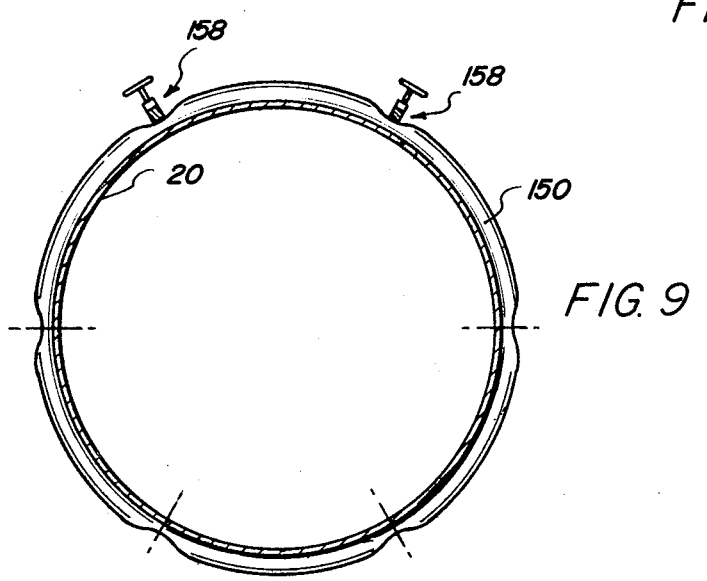
FIG. 9 is a detail cross-sectional view of the external coil taken on line 9—9 of FIG. 1.

To assure continuous agitation and mixing of the slurry as it is being flowed through the coils, a plurality of screw operated clamp mechanisms 158 are mounted on the exterior of the outer shell to compress the tubing against the outer wall of the shell at several points around the circumference of shell, as best indicated in FIG. 9. The compressed section of the flexible walled tubing of which the coils are constructed presents a discontinuity in the flow passage, thus creating turbulence tending to thoroughly maintain the slurry in an agitated state during its passage through the coils.

In the copper precipitation process for which the present apparatus was specifically designed, copper sulfate liquor is fed continuously into the upper central tube section 106 at a controlled rate while powdered iron particles are fed continuously into the upper end of tube 106 at a rate correlated with the inlet flow of the copper sulfate liquor. In the slurry thus formed, the iron particles react with the copper sulfate solution to yield a ferrous sulfate solution and metallic copper. To efficiently practice this process, it is necessary that the iron particles and copper sulfate solution be thoroughly mixed and completely exposed to each other in order that the desired reaction can occur during the period of time in which the slurry is passing through the present apparatus. Thus, the apparatus must be operated at a flow rate slow enough to achieve an adequate retention time for the reaction to occur while at the same time establishing a flow of slurry which prevents the iron particles from settling at various points along the flow path.

The present apparatus is designed to maintain the slurry thoroughly agitated at relatively low flow rates through the apparatus by frequently dividing and recombining the slurry flow path through the various nozzles and coils and introducing discontinuities in the shape of the flow passage by the clamping of the coils, skirts 44 and the nozzles.

The copper sulfate liquor and the iron particles, as stated above, are continuously fed into the upper central tube section 106 and are initially mixed in this section by the manner of their introduction. The slurry flows downwardly through the central flow passage 26 and a further mixing action is achieved as the slurry must pass through the restricted orifice nozzles mounted in the plates 64. As best seen in FIGS. 6 and 8, the passages in nozzles 66 of plates 64 receive the slurry in an axially directed flow, change the direction of flow by 90° and discharge the slurry beneath the plates 64 in tangentially directed directions. The swirling flow established by the passage of the slurry through the nozzles, combined with the flow passage restriction established by the plates creates a turbulence within the slurry flowing downwardly through the central flow passage 26 to maintain the slurry thoroughly agitated during this portion of its flow path. From the lower end of central flow passage 26, the slurry is passed through pump 136, the pump itself thoroughly and effectively agitating the slurry. From the pump, the flow of slurry is equally divided among the external coils 146, 148 and 150, turbulent flow within the coils being induced by the clamped or compressed sections of the coil established by clamp assemblies 158. In addition to increasing the reaction time by effectively lengthening the flow path, the location of coils 146, 148 and 150 at the exterior of the shell 20 provides an effective heat exchange mechanism for maintaining the slurry temperature within the desired range. From the coils, the slurry is feed into inlet compartment 78 via nozzles 86. Nozzles 86 are arranged to discharge the slurry in a tangentially directed swirling flow in the lower portion of inlet compartment 78, and this same action is achieved during the passage of the slurry upwardly through the successive compartments via the nozzles in plates 42', 42 and 108.

The cross-sectional area of the flow passage 28 through this last group of compartments is varied by skirt portion 82 and skirts 44 so that the slurry enters each of these compartments in a relatively restricted section of the flow passage and then rises upwardly to a portion of greater cross-sectional area. Thus, the lower portion of each compartment is maintained in a state of relatively high turbulence to effectively prevent any accumulation in the lower portion of the compartments of iron particles which may have settled out from the somewhat less turbulent flow pattern occurring in the upper portion of the compartment.

From the uppermost compartment, the slurry passes over the upper edge of cylindrical section 110 into annular trough 118 from which it is drained by outlet conduit 120 which conducts the slurry to a separating tank which extracts the metallic copper from the solution.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

I claim:

1. Apparatus for carrying out a continuous liquid-solid reaction comprising shell means defining a vertically disposed cylindrical chamber, a slurry conducting tube extending coaxially through said chamber, means for feeding a liquid-solid slurry into the upper end of said tube, a plurality of vertically spaced horizontal plate means extending from the exterior of said tube to said shell means dividing said chamber into a plurality of annular compartments, a plurality of nozzle means in each of said plate means defining slurry flow passages through said plate means, a plurality of separate slurry conducting coils mounted externally of said chamber, pump means for pumping slurry from the lower end of said tube to said coils, conduit means individually connecting each of said coils to a portion of the nozzle means in the lowermost of said plates to conduct slurry from said coils into the lowermost of said compartments, and slurry outlet means communicating with the uppermost of said compartments for conducting slurry from said apparatus.

2. Apparatus as defined in claim 1 further comprising a plurality of apertured discs mounted in and extending horizontally across the interior of said tube to restrict the rate of flow of slurry through said tube.

3. Apparatus as defined in claim 2 comprising the further improvement of nozzle means mounted in said apertured discs defining the apertures in said discs, said nozzle means being oriented to discharge slurry flowing therethrough beneath the disc in which the nozzle means are mounted in a horizontal generally tangentially directed path.

4. Apparatus as defined in claim 1 wherein said coils each comprise a length of hollow tubing wound in a plurality of turns about the outer side of said shell means, and clamp means for compressing said hollow tubing radially inwardly against said shell means at spaced points about its circumference to distort said tubing to induce turbulence in the slurry flowing therethrough.

5. Apparatus as defined in claim 4 wherein said clamp means comprises a bar extending axially across and beyond each coil at the side of the coil remote from said shell means, and adjustable means on said shell means at each end of said bar for positioning said bar at an adjusted radial spacing from said shell means.

6. Apparatus as defined in claim 1 further comprising a frusto-conical skirt coaxial with and fixedly secured at its upper end to said tube, said skirt being inclined downwardly and outwardly from said tube to one of said plate means and secured about its lower periphery to said one of said plate means, the nozzle means in said one of said plate means being located radially outwardly of said skirt.

7. In an apparatus for carrying out a liquid-solid reaction wherein a liquid-solid slurry is passed downwardly through a vertically disposed tube and subsequently flowed upwardly successively through a series of vertically aligned annular compartments surrounding said tube; the improvement wherein said tube and said compartments are defined by a plurality of modular units, each of said units comprising a cylindrical tube section having an annular sealing flange at one end thereof, an annular plate fixedly secured to and extending radially from the lower end of said tube section in coaxial relationship therewith, a frusto-conical skirt fixedly secured to said tube section and said plate in coaxial relationship with said tube section, a plurality of nozzles mounted in and extending through said plate to define flow passages therethrough in the region of said plate outwardly of said skirt, and an open ended cylindrical shell having peripheral flange means at each end adapted to sealingly receive the outer peripheral edge of said plate, said shell having an axial length equal to that of said tube section, and means for clamping a plurality of said units in sealed end to end relationship with each other.

8. Apparatus for carrying out a continuous liquid-solid reaction comprising cylindrical shell means defining vertically disposed concentric inner and outer flow passages for accomodating a continuous flow of a liquid-solid slurry, a plurality of slurry conducting coils wound about the exterior of said shell means, each of said coils having an inlet in fluid communication with the lower end of said inner flow passage and an outlet in fluid communication with the lower end of said outer flow passage, means for supplying a controlled flow of liquid-solid slurry to the upper end of said inner flow passage, flow distributing means including pump means for conducting slurry from the lower end of said inner flow passage and dividing the flow of slurry among said coils, means for recombining the flow of slurry from said coils in the lower end of said outer flow passage, agitating means for agitating the slurry during its passage through said inner flow passage, said coils and said outer flow passage, and slurry outlet means at the upper end of said outer flow passage for discharging slurry from said apparatus.

* * * * *